UNITED STATES PATENT OFFICE 2,679,541

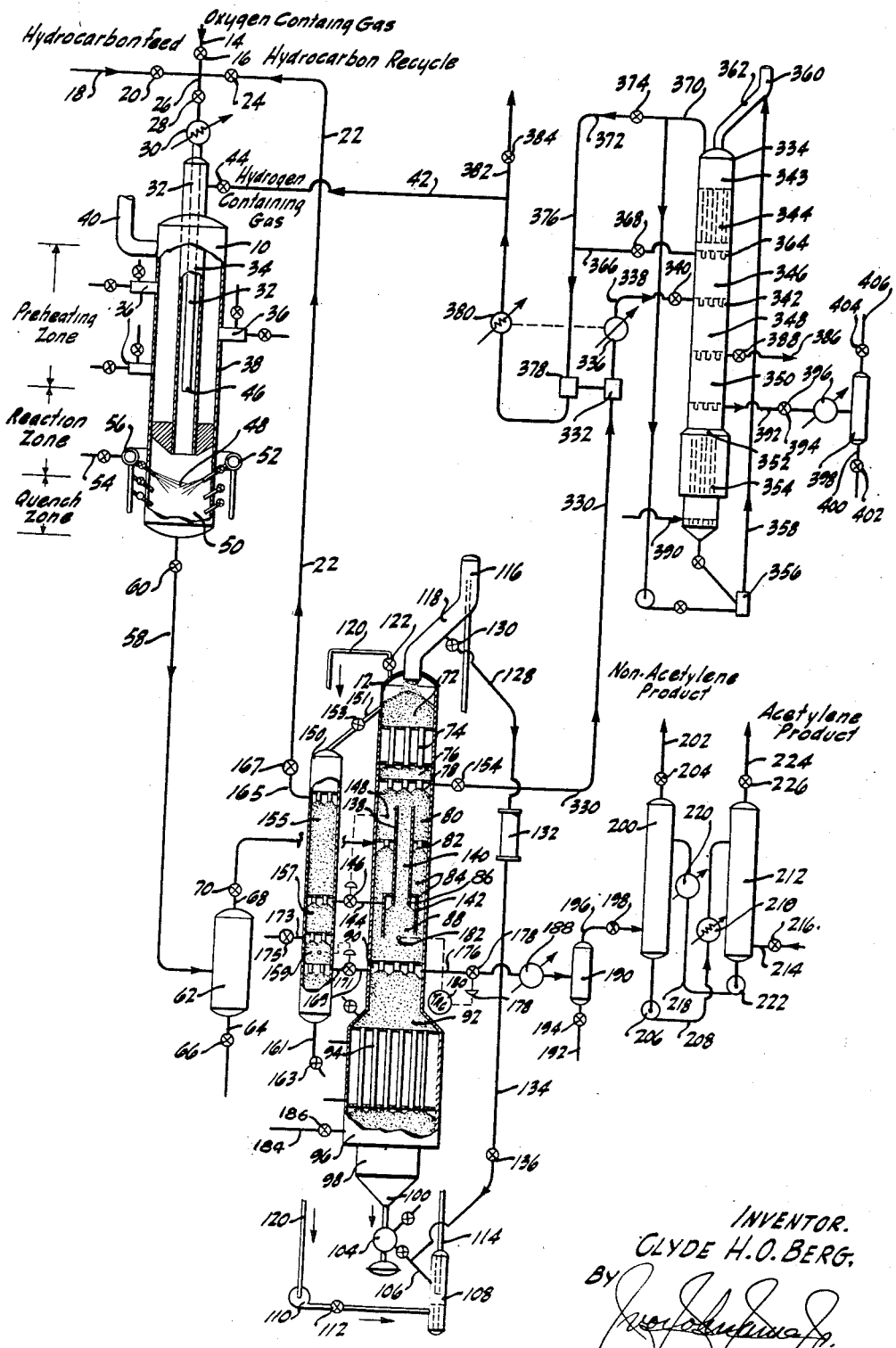

APPARATUS AND PROCESS FOR ACETYLENE PRODUCTION

Clyde H. O. Berg, Long Beach, Calif., assignor to Union Oil Company of California, Los Angeles, Calif., a corporation of California Application July 28, 1950, Serial No. 176,476

17 Claims. (Cl. 260—679)

This invention relates to the high temperature conversion of hydrocarbons and relates to the production of unsaturated hydrocarbons such as the acetylenes. In particular the present invention relates to an improved process for the efficient conversion of hydrocarbons to acetylenes assisted by a conversion effluent separation from which a portion of the gases separated from the acetylene is returned and injected into the conversion process whereby increased acetylene yields and other advantages are obtained.

The production of acetylene by the partial oxidation of hydrocarbon vapors or gases is well known. Good yields of acetylene are obtained only at relatively high temperatures of the order of 1500° C. At these temperatures appreciable quantities of acetylene are formed but the products must be rapidly cooled or quenched to inhibit undesired side reactions which consume the acetylene thus formed. Furthermore, it has heretofore been found that the highest yields of acetylene are obtained when oxygen of relatively high purity is employed as the oxidizing medium. Because of the expense of producing high purity oxygen in quantities necessary for such a partial oxidation operation many unsuccessful attempts to develop a commercially feasible process using air as the oxidizing medium have been made. The problems encountered included a requirement of higher temperatures because of the lower oxygen partial pressure, but primarily the great quantities of diluent nitrogen in the product gases adversely effect the customary procedures for recovering the acetylene produced. With oxygen as the oxidizing medium the usual acetylene yields are about 40% based on the hydrocarbon consumed and yields with air at best are somewhat less.

The present invention is therefore directed to an improved process and apparatus for the production of acetylene using air as the oxidizing medium in which a combination of a partial oxidation step and an effluent gas purification cooperatively cofunction together to permit acetylene yields appreciably greater than those heretofore obtained with pure oxygen as the oxidizing gas and wherein the presence of nitrogen exerts no adverse effect on the handling and separation of the effluent gases.

It is a primary object of the present invention to provide an improved acetylene-production process wherein a hydrocarbon vapor or gas is reacted in the presence of an oxygen-containing gas such as air and in which the conversion reaction is initiated by introducing a gas containing hydrogen into the preheated reactants.

It is another object of this invention to provide a combination process including the acetylene-producing step in combination with a two-stage product gas separation step wherein a high recovery of acetylene is obtained with reduced carbon dioxide recovery therewith in the presence of nitrogen, and in the second step hydrogen is separated from nitrogen for recirculation to the acetylene-producing step.

A further object of the present invention is to provide a cooperative combination of an acetylene-producing process with a two-stage separation step for effluent gases containing acetylene in which a moving bed of granular adsorbent is employed.

It is also an object of the present invention to provide an apparatus capable of effecting the foregoing objects.

Other objects and advantages of the present invention will become apparent to those skilled in the art as the description thereof proceeds.

Briefly, the present invention comprises a process for the production of acetylene by the partial oxidation of hydrocarbon gases or vapors with an oxygen-containing gas such as air wherein these gases are preheated and the acetylene-forming reaction initiated or "touched off" by introducing a gas relatively rich in hydrogen into the preheated reactant gas stream. The effluent gases from the reaction, after quench cooling, are first introduced into the low pressure stage of a two-stage adsorptive separation operation. In this first stage the effluent stream is divided into four fractions including a relatively pure acetylene stream, a stream containing methane and carbon dioxide which is subsequently separated and the methane returned to the acetylene-producing step, and a stream containing hydrogen, nitrogen, and carbon monoxide. The unadsorbed hydrogen-, nitrogen-, and carbon monoxide-containing stream is subsequently compressed and introduced into the higher pressure second stage from which a stream rich in hydrogen is produced for recirculation to the acetylene-producing step.

It has been found that the injection of such a hydrogen-rich gas increases the acetylene yield in the acetylene-producing step to a higher value than that formerly attained in other processes using pure oxygen, in spite of the diluent effects of nitrogen when air is used as the source of oxygen.

It has been found that an active cooperation exists between the adsorptive separation steps and the acetylene-producing steps as disclosed in the present invention which are not attained when other processes are employed to separate the constituents in the acetylene-containing effluent. The use of air as an oxidizing agent in the acetylene-production step yields an acetylene-containing effluent containing nitrogen. In the adsorptive separation of acetylene from such an effluent, the presence of nitrogen in some way decreases the amount of carbon dioxide recovered along with the acetylene in the product stream from the first stage of the adsorptive separation step. In the absence of nitrogen, appreciable quantities of carbon dioxide are produced with and contaminate the acetylene product. When nitrogen is present in the feed gas this carbon dioxide contamination is reduced and causes it to be separated along with methane rather than the $C_2$ hydrocarbon fraction in which it is usually found. This has a great beneficial effect in that the subsequent acetylene-purification step, if employed, is rendered less difficult and the product from the first adsorptive stage may be directly used in some operations because the recovery of the carbon dioxide in that stream is reduced.

The unadsorbed gas containing the lighter constituents of the effluent, namely, hydrogen, nitrogen, and carbon monoxide, is produced from the first adsorption stage and is compressed to an elevated pressure and contacted with a second moving bed of granular adsorbent in the absence of carbon dioxide and other hydrocarbon constituents present in the effluent stream. It has been found that the separation of these three gases is considerably simplified in the absence of carbon dioxide and the hydrocarbon constituents since at elevated pressures lower temperatures are sufficient to desorb the hydrogen and carbon monoxide from the adsorbent than when carbon dioxide and/or the hydrocarbon gases are present.

Thus, the presence of nitrogen in the effluent assists the operation of the first adsorptive stage as described. The production of an unadsorbed gas from the first stage which is substantially free of $CO_2$ and hydrocarbons markedly improves the operation of the second stage which is conducted at high pressure and permits a substantially pure hydrogen stream to be separated. Further, the high purity hydrogen stream when injected into the preheated reactant gas mixture touches off the reaction producing much improved acetylene yields, reducing the quantity of hydrocarbon which is oxidized to carbon dioxide, prevents the formation of free carbon common to most acetylene-production processes, decreases the required degree of preheat of the reactant gases and has the overall effect of improving the acetylene yield. For these reasons it is apparent that an active cooperation exists between the particular acetylene-production process and the particular mode of effluent treatment herein employed.

The particular details of the present invention and the operating procedure thereof will be more apparent upon reference to the accompanying drawing which is a schematic flow diagram of a process employing the principles of the present invention.

Referring now more particularly to the drawing, acetylene producing reactor 10, adsorptive separation column 12 and adsorptive separation column 334 are shown. Referring in particular to acetylene reactor 10 an oxygen-containing gas such as air is introduced via line 14 at a rate controlled by valve 16 and is combined with fresh hydrocarbon gas or vapor passing through line 18 at a rate controlled by valve 20. Unreacted hydrocarbon as a recycle stream flowing via line 22 is also introduced at a rate controlled by valve 24 is also introduced forming a reactant gas mixture having a controlled proportion of hydrocarbon to oxygen. This reactant gas is subsequently passed via line 26 at a rate controlled by valve 28 into reactant gas preheater 30 wherein the temperature is raised prior to introduction into acetylene reactor 10. The preheated reactant gases are subsequently passed through tube 32 supported within outer tube 34 within acetylene reactor 10, a plurality or only a single pair of inner and outer tubes shown may be employed.

The upper portion of reactor 10 or that part surrounding tube 32 comprises a preheating zone, heat being added by means of burners 36 which may be, if desired, gas fired burners of conventional design firing into the annular space between shell 38 of reactor 10 and outer tube 34. A stack 40 is provided for the removal of flue gases from the preheating zone. The hydrogen-containing gas described above and used for initiating the acetylene-producing reaction is introduced into the annular space between inner tube 32 and outer tube 34 by means of line 42 controlled by valve 44. This gas is also preheated while passing through the preheating zone.

That part of outer tube 34 between inner tube outlet 46 and quench 48 is the reaction zone within which the production of acetylene occurs.

Variation in the reaction time may be effected in one of several ways. First, the flow rate of gases through the reaction zone may be increased or decreased to change the reaction time. Once an optimum lineal reactant gas velocity is determined the duration of the reaction may be further varied by altering the position of quench 48 within quenching zone 50. In the type of quenching shown in the drawing, cold water is sprayed directly into the hot effluent gases at a sufficient rate cooling the reactant gases to stop the acetylene-producing reaction and prevent undesirable side reactions. In this quenching zone header 52 is provided having inlet pipe 54 controlled by valve 56 whereby cold water or other quench fluids are introduced into the header. Individual spray nozzles 56 are provided with valves whereby the water is directly injected into the quenching zone. A plurality of nozzles or inlets for quenching fluid is provided along the length of the quenching zone thereby making the distance over which the reacting gases pass before quenching and consequently the reaction time controllable within relatively wide limits. If desired, the quenching zone may be made substantially the same diameter as outer tube 34 or the diameter may be somewhat larger as shown in the drawing.

The quenched mixture of acetylene-bearing product gas and quenching fluid is removed from the quenching zone 50 by means of line 58 controlled by valve 60 and is introduced into vapor liquid separator 62 wherein the quenching fluid is separated from the cooled effluent gas. The quenching fluid is removed from separator 62 via line 64 controlled by valve 66 which may be actuated, if desired, by a liquid level controller not shown which maintains a liquid level in the separator. The quenched product gases are removed from the separator by means of line 68 at a rate controlled by valve 70 and are subsequently sent to the effluent gas purification stage of the process for acetylene recovery.

Referring now particularly to adsorptive separation column 12 the column is provided at successively lower levels therein with hopper zone 72, cooling zone 74, secondary adsorption zone 76, lean gas product disengaging zone 78, primary adsorption zone 80, feed gas engaging zone 82, primary rectification zone 84, side cut gas disengaging zone 86, secondary rectification zone 88, rich gas product disengaging zone 90, adsorbent stripping zone 92, adsorbent heating zone 94, stripping gas engaging zone 96, adsorbent feeder zone 98 wherein adsorbent circulation is controlled, and bottom zone 100. The adsorbent is introduced into the top of the column and passes downwardly successively through the aforementioned zones as a substantially compact moving bed of granular adsorbent. The adsorbent is removed from bottom zone 100 and passed through sealing leg 102 into adsorbent flow control valve 104, the operation of which maintains a constant adsorbent level in bottom zone 100. The adsorbent passes from zone 104 through transfer line 106 into adsorbent induction zone 108. Herein a conveyance gas recirculated by means of conveyance gas blower 110 controlled by valve 112 forms a suspension of solid granular adsorbent which is conveyed via conveyance line 114 into impactless separator 116. Herein the suspension is broken and the solid granular adsorbent and the conveyance gas pass as substantially independent phases via transfer line 118 into hopper zone 72 above described. The conveyance fluid is removed from the top of column 12 via line 120 at a rate controlled by valve 122 and is returned to the suction inlet of blower 110. In this fashion a continuous recirculation of solid granular adsorbent passing downwardly through column 12 and upwardly through conveyance line 114 is maintained, the adsorbent passing successively through zones of cooling, adsorption, a plurality of rectification zones, stripping and heating.

A portion of the thus recirculating adsorbent is removed from transfer line 118 via line 128 controlled by valve 130 and is subjected to reactivation conditions of high temperature and the presence of a reactivating gas in reactivation zone 132. The reactivated adsorbent is removed therefrom via line 134 at a rate controlled by means 136 and introduced into transfer line 106 for recirculation in the system.

Contained within column 12 and extending between adsorption zone 80 and through primary rectification zone 84 is tertiary tube 138 containing tertiary rectification zone 140 therein. Tertiary tube 138 brings adsorbent from the upper portion of adsorption zone 80 where it is free of rich gas constituents downwardly therethrough and introduces it below side cut product disengaging zone 86. This disengaging zone comprises an annular volume formed between the lower portion of tertiary tube 138 enclosed within a somewhat larger tube 142. The body of adsorbent contained within tube 142 is in reality an extension of secondary rectification zone 88 the operation and performance of which will be subsequently described.

The cooled effluent gases are passed via line 68 controlled by valve 70 into feed gas engaging zone 82. The gas thus introduced contains hydrogen, nitrogen, carbon monoxide, methane, carbon dioxide, acetylene, ethylene, ethane, and traces of higher molecular weight hydrocarbons.

Upon passage of this gaseous mixture through adsorption zone 80 all constituents but hydrogen, nitrogen, and carbon monoxide are adsorbed on the absorbent between the feed gas engaging zone 82 and the upper open inlet of tertiary tube 138. The effect of this is to saturate the adsorbent introduced into tertiary tube 138 with hydrogen, nitrogen, and carbon monoxide only and maintain it substantially free of methane, carbon dioxide, and the $C_2$ hydrocarbons. The unadsorbed hydrogen, nitrogen, and carbon monoxide are at least partly removed from lean gas disengaging zone 78 via line 152 controlled by valve 154 while the remaining portion thereof passes upwardly through cooling zone 74 to remove traces of stripping gas from the adsorbent.

The rich adsorbent removed from adsorption zone 80 passes downwardly into primary rectification zone 84 wherein it is contacted by a countercurrent flow of reflux gas containing carbon dioxide, methane, and $C_2$ hydrocarbons. A refluxing action occurs which desorbs less readily adsorbable hydrogen, nitrogen, and carbon monoxide from the adsorbent forming a rectified adsorbent. The rectified adsorbent passes downwardly into secondary rectification zone 88 wherein it is contacted with a reflux gas containing carbon dioxide and $C_2$ hydrocarbons. Another active refluxing step occurs in which methane is desorbed from the adsorbent a portion of which passes within secondary tube 142 countercurrent to the adsorbent introduced thereinto via tertiary tube 140. The desorbed methane accumulates in side cut gas disengaging zone 86. A portion of this desorbed methane passes upwardly through tertiary tube 138 effecting an active refluxing step in which the adsorbent passing downwardly therethrough is freed of its adsorbed hydrogen, nitrogen, and carbon monoxide constituents by preferential adsorption.

The carbon dioxide and methane are desorbed from the adsorbent in secondary rectification zone 88 and accumulate in side cut disengaging zone 86. A portion thereof is employed as reflux as described in rectification zone 140 while the remainder is removed from zone 86 via line 144 at a rate controlled by valve 146 in accordance with the temperature indicated by thermocouple 148 in adsorption zone 80. Thermocouple 148 may also be placed in primary rectification zone 84. The remaining portion of the thus desorbed side cut gas product containing carbon dioxide and methane is introduced via line 144 into auxiliary purification column 150 the operation of which is described below.

A moving bed of adsorbent is introduced into the auxiliary column via line 151 controlled by valve 153. This flows downwardly as a moving bed through auxiliary adsorption zone 155, auxiliary rectification zone 157, and auxiliary desorption zone 159. The adsorbent then is removed from column 150 and passed via line 161 controlled by valve 163 preferably into preferential desorption zone 92. In zone 155 the carbon dioxide and a trace of methane are adsorbed while the remainder of methane unadsorbed is removed via line 165 controlled by valve 167 for recirculation to the acetylene-producing step. The rich adsorbent saturated with carbon dioxide and some methane is contacted with a carbon dioxide-rich reflux gas in zone 157 whereby traces of methane are desorbed. The rectified adsorbent formed is subsequently treated in desorption zone 159 for carbon dioxide desorption. This may be accomplished by a preferential desorption using a portion of the rich gas product flowing via line 169 controlled by valve 171 or by heating and stripping the adsorbent similarly as is done in zones 92 and 94 in column 12. In the latter case the stripped adsorbent is passed via line 161 into induction zone 108 rather than zone 92 as is done when acetylene gases are used for desorption.

Regardless of the means of carbon dioxide desorption, the desorbed gas is removed from a point between zones 157 and 159 via line 173 controlled by valve 175. This gas is then sent to storage facilities, Dry Ice processing or the like or vented to the atmosphere.

The rectified adsorbent is passed from both parts of secondary rectification zone 88 (within and outside tube 142 as well as below it) into stripping zone 92 wherein it is counter-currently contacted with a stripping gas by means of which the carbon dioxide and $C_2$ hydrocarbons including acetylene are preferentially desorbed. A portion of these desorbed constituents is employed in secondary rectification 88 as reflux while the remainder thereof is removed from disengaging zone 90 via line 176 at a rate controlled by valve 178 actuated by temperature recorder controller 180 under the influence of thermocouple point 132 in contact with the adsorbent in secondary rectification zone 88. Reflux control is thus maintained since as greater quantities of reflux, provided by closing valve 178, pass into secondary rectification zone 88 the adsorbent temperature increases as the heavier constituents are adsorbed and the heat of adsorption is released.

The partially stripped adsorbent in stripping zone 92 subsequently passes through the tubes of heating zone 94 wherein the charcoal is heated and contacted with further quantities of stripping gas introduced into the stripping gas engaging zone 96 via line 184 controlled by valve 186. The presence of stripping steam in the heated adsorbent effects desorption or stripping of the residual adsorbed constituents and at the same time sufficiently reduces the partial pressure of the acetylene and carbon dioxide to prevent decomposition thereof. The desorbed gases then flow into stripping zone 92 and are removed with the desorbed gases there from rich gas disengaging zone 90 as described. The desorbed rich gas together with stripping steam is passed via line 176 into condenser 188 in which the stripping steam is condensed. The steam condensate is separated from the cooled desorbed gas in separator 190 and removed therefrom via line 192 controlled by valve 194. The cool rich gas, consisting essentially of carbon dioxide and the acetylene-containing $C_2$ hydrocarbon fraction, passes subsequently via line 196 through depressuring valve 198 into the solvent extraction system wherein carbon dioxide and $C_2$ hydrocarbons are separated from the acetylene.

Preferably the acetylene extraction system is maintained at a pressure of about 20 pounds per square inch gauge. The acetylene-bearing gases are first contacted in absorber 200 with a countercurrent flow of solvent such as dimethoxy tetramethylene glycol or other solvent having a high absorbent power for acetylene but not for carbon dioxide. The unabsorbed gases are removed therefrom via line 202 controlled by back pressure regulator 204. The rich solvent is passed via pump 206 and line 208 through heater 210 into solvent stripper 212. Herein the rich solvent is countercurrently contacted with a stripping gas introduced via line 214 controlled by valve 216 into the bottom. The hot lean absorbent is passed via line 218 and solvent cooler 220 by means of pump 222, the cool solvent being returned to the top of absorber 200. The acetylene stripped from the solvent in stripper 212 is removed therefrom via line 224 controlled by back pressure regulator 226 and is sent to further processing or storage facilities not shown. The purity of the product thus treated is usually better than 95% and can be made as high as 98% by volume pure acetylene.

The pressure of operation of the first stage of adsorption is preferably a little below that of the acetylene reactor, that is, between about 5 and 50 pounds per square inch absolute.

The adsorbent rate required decreases with the fraction of gas to be adsorbed and with increasing operating pressure and depends upon the adsorbent employed. In separating effluent gases produced according to this invention with activated coconut charcoal as adsorbent, between about 150 and 350 pounds per thousand standard cubic feet of effluent gas are needed. For separating methane from carbon dioxide between about 100 and 300 pounds per thousand standard cubic feet are required in the above pressure range.

Referring now more particularly to the lean gas product removed from disengaging zone 78, the gaseous mixture is passed via line 330 into the hydrogen, nitrogen, compressor 332 wherein the hydrogen, nitrogen, and carbon monoxide gaseous mixture is compressed to a pressure of between about 350 and 600 pounds per square inch gauge for separation in high pressure adsorption column 334. The compressed gas is subsequently passed through cooler 336 and line 338 controlled by valve 340 into feed gas engaging zone 342.

Within column 334 an adsorbent recirculation as a moving bed is maintained analogous to that maintained in the first stage of the adsorptive separation carried out in column 12. The adsorbent passes downwardly in column 334 successively through hopper 343, cooling zone 344, adsorption zone 346, primary rectification zone 350, stripping 348, secondary rectification zone 354. The adsorbent is zone 352, and heating zone 354. The adsorbent is subsequently removed from the bottom of the column, combined with a recirculated conveyance fluid in induction zone 356, and passed through conveyance zone 358 into separator 360 wherefrom the adsorbent is passed via transfer line 362 into the top of column 334.

In adsorption zone 346 under the conditions of operation, nitrogen and carbon monoxide are adsorbed and pass with the adsorbent into primary rectification zone 348. The unadsorbed hydrogen in substantially pure form passes upwardly and a portion thereof may be removed from lean gas disengaging zone 364 via line 366 controlled by valve 368. The remaining portion passes upwardly through cooling zone 344 and is removed therefrom with the lift gas via line 370. A portion of the recirculating lift gas, more enriched in hydrogen than the lean gas product, may be removed via line 372 at a rate controlled by valve 374. Thus, two sources of enriched hydrogen gas are provided and either one or a blend of the two may be recirculated via line 376 through expansion turbine 378 (which may drive compressor 332) through heater 380 for recirculation via line 382 to the acetylene production step. Since there is a net production of hydrogen in the process, this excess may be bled from this hydrogen stream via line 382 controlled by valve 384. If desired the other product gases from this column may also be depressured through expansion turbines to drive compressor 332.

If desired cooler 336 and heater 380 may comprise a heat interchanger.

The rich adsorbent passing through primary rectification zone 348 is contacted with a reflux gas comprising nitrogen serving to desorb traces of hydrogen in the adsorbent forming a partially rectified adsorbent. This adsorbent subsequently passes into secondary rectification zone 350 wherein a reflux of carbon monoxide preferentially desorbs nitrogen which is partly employed as reflux in zone 348 and the remainder is removed as a side cut gas product via line 336 controlled by valve 388.

If desired, this side cut gas product may be eliminated and the nitrogen produced together with carbon monoxide as described below.

The rectified adsorbent discharged from zone 350 passes into stripping zone 352 wherein carbon monoxide and any lighter gases are preferentially desorbed by a stripping gas introduced below heating zone 354 via line 390. The desorbed carbon monoxide is partly employed as reflux in zone 350 and the remainder is removed as a rich gas product via line 392 controlled by valve 394 and passed through cooler 396 wherein the stripping gas is condensed and the rich gas product cooled. Separator 398 is provided from which condensate is removed via line 400 controlled by valve 402 and the rich gas product is removed therefrom via line 404 controlled by back pressure regulator 406.

The adsorbent is heated in heating zone 354 and contacted with further quantities of stripping gas such as steam forming a lean hot adsorbent which is recirculated as described to the top of column 334 for reuse.

As an example of the process the following data are given:

EXAMPLE I

A reactant gas mixture consisting of 21.4% methane and 78.6% air is introduced at a rate of 500 volumes (at standard conditions) per hour into the preheating zone of the acetylene reactor. Pure hydrogen is recirculated from the second stage of the purification system at a rate of 321 volumes per hour giving a ratio of hydrogen to methane of 3.0 mols per mol. The reaction temperature, the maximum temperature to which the reactant gases rise after introduction of the hydrogen, is usually about 1200° C., the preheating time is 0.00612 second, the reaction time is 0.00508 second. The acetylene yield is 39% based on the quantity of methane introduced into the reactor and 64% based on the methane reacted. A product gas is removed at a rate of 730 volumes per hour and has the following analysis:

*Table 1*

| Component | Mol Percent |
|---|---|
| Nitrogen | 42.6 |
| Hydrogen | 45.0 |
| Methane | 6.2 |
| Acetylene | 3.1 |
| Ethylene | 0.5 |
| Carbon Monoxide | 2.3 |
| Carbon Dioxide | 0.2 |
| Oxygen | 0.1 |
| | 100.0 |

This product gas is quenched by means of a water spray, cooled to a temperature of about 100° F. and after separation of the water is introduced into the first stage of the two-stage adsorptive separation system. Herein the cooled product gas is contacted with 250 pounds of activated charcoal per thousand standard cubic feet of gas at a pressure of 20 pounds per square inch gauge. A lean gas product consisting of unadsorbed hydrogen, nitrogen, oxygen, and carbon monoxide is produced from the first column at a rate of 657 volumes per hour and has the following composition:

*Table 2*

LEAN GAS COMPOSITION FIRST ADSORPTION STAGE

| Component | Mol Percent |
|---|---|
| Hydrogen | 44.9 |
| Nitrogen | 47.2 |
| Oxygen | 0.1 |
| Carbon Monoxide | 2.6 |
| Methane | 0.2 |
| | 100.0 |

This gas is sent to the second adsorptive stage for hydrogen purification. A side cut gas product is removed from a point below the feed gas inlet in the first adsorption stage and has approximately the following composition:

*Table 3*

SIDE CUT GAS COMPOSITION FIRST ADSORPTION STAGE

| Component | Mol Percent |
|---|---|
| Nitrogen and CO | 0.2 |
| Methane | 96.7 |
| Carbon Dioxide | 3.0 |
| $C_2$ Hydrocarbons | 0.1 |
| | 100.0 |

This gas is produced at a rate of 44.5 volumes per hour and is subsequently contacted with about 210 pounds of activated charcoal per thousand standard cubic feet of gas in a separate purification column at a pressure about the same as that of the first adsorption step. Herein the carbon dioxide is adsorbed preferentially from the methane leaving the methane substantially unadsorbed. Unadsorbed methane is recirculated at a rate of 43 volumes per hour for retreatment in the acetylene production step. The adsorbed carbon dioxide is subsequently desorbed from the adsorbent by means of a countercurrent reflux of acetylene product gas introduced directly from the bottoms product outlet of the main adsorption column. This gas is substantially pure carbon dioxide and is removed from the column at a rate of 14 volumes per hour. The acetylene-saturated adsorbent, removed from the carbon dioxide adsorption step, is then returned to the stripping zone of the main adsorption column. In another modification it is returned to the secondary rectification zone immediately above.

The rectified adsorbent in the main adsorption column, saturated with acetylene and $C_2$ hydrocarbons, is subsequently contacted at a temperature of about 180° F. with a gas rich in steam thereby effecting a preferential desorption of most of the $C_2$ hydrocarbons. The partially stripped adsorbent is subsequently indirectly heated to about 475° F. and contacted with further quantites of steam to desorb substantially all of the residual $C_2$ hydrocarbons. The thus desorbed $C_2$ hydrocarbons are produced as a bottoms or rich gas product at a rate of 27.1 volumes per hour, the gas analyzing as follows:

*Table 4*

RICH GAS PRODUCT FIRST ADSORPTION STAGE

| Component | Mol Percent |
|---|---|
| Methane | 0.2 |
| Acetylene | 85.0 |
| $C_2+$ | 14.8 |
| | 100.0 |

The acetylene product is subsequently purified by countercurrent contact with an acetylene solvent.

The lean gas containing hydrogen, nitrogen, and carbon monoxide primarily is subsequently compressed from 20 pounds per square inch gauge to about 450 pounds per square inch gauge in a multistage centrifugal compressor driven by an expansion turbine through which the high pressure product gases from the second adsorption stage are depressured. The compressed gas is then contacted in the second adsorption stage by 850 pounds of activated charcoal per thousand standard cubic feet of feed gas. An unadsorbed lean gas product is removed at a rate of 331 volumes per hour and has the following composition:

*Table 5*

LEAN GAS SECOND ADSORPTION STAGE

| Component | Mol Percent |
|---|---|
| Hydrogen | 99.1 |
| Nitrogen | 0.9 |
| | 100.0 |

A portion of this gas is used for recirculation to the acetylene production stage at a rate of 300 volumes per hour. Since there is a net production of hydrogen in the process 31 volumes per hour of this pure hydrogen are removed from the process. The rich adsorbent in the second adsorption stage is subsequently stripped and nitrogen and carbon monoxide produced as a rich gas product is removed therefrom at a rate of 324 volumes per hour and has the following composition:

*Table 6*

RICH GAS PRODUCT SECOND ADSORPTION STAGE

| Component | Mol Percent |
|---|---|
| Hydrogen | 0.1 |
| Nitrogen | 94.7 |
| Carbon Monoxide | 5.2 |
| | 100.0 |

In one modification at these pressures a side cut product containing a high concentration of nitrogen is produced as is a bottoms product of carbon monoxide in a similar fashion as employed in the first adsorption stage.

In order to show the effect on the acetylene reaction of recirculation the same quantity of nitrogen instead of hydrogen the following data are given in which an acetylene production run is carried out at substantially the conditions given above in which nitrogen is substituted for the recirculated hydrogen stream there specified. No acetylene is produced. This is significant in that it indicates that hydrogen is essential in initiating the acetylene production reaction after the mixed reactant gases have been preheated.

EXAMPLE II

When the same acetylene reaction is carried out using a reactant gas substantially as set forth in Example I and in which no recirculated gas is employed it is found that the acetylene yield is only 10.8% based on the methane reacted. This result is significant in that it shows that only a very small proportion of the acetylene product obtained in the process of the present invention may be realized in the absence of a hydrogen recirculation.

As above stated it has been found that the presence of nitrogen in the feed gas to the first adsorption stage exerts a significant effect upon the carbon dioxide recovery in the rich gas product, the reasons for which are not as yet clearly understood. A product gas manufactured with the use of pure oxygen rather than air is of course free of nitrogen while acetylene production with using air as an oxidizing agent contains as much as 40% to 50% nitrogen. It has been found that in the adsorptive separation of such gaseous mixtures the recovery of carbon dioxide as an undesired constituent in the rich gas product which desirably contains only $C_2$ hydrocarbons is considerably lower in those cases where nitrogen is present in the feed gas. This effect is illustrated by the following data:

EXAMPLE III

The analyses of acetylene-bearing gases are given below typical of products obtained using air or oxygen in the combustion of natural gas:

| Component | Oxidized With Air Mol Percent | Oxidized With Oxygen, Mol Percent |
|---|---|---|
| Hydrogen | 43.8 | 53.9 |
| Nitrogen | 23.0 | --- |
| CO | 20.4 | 25.3 |
| Methane | 3.0 | 4.6 |
| $CO_2$ | 5.5 | 7.5 |
| Acetylene | 4.0 | 8.1 |
| $C_2+$ | 0.3 | 0.6 |
| | 100.0 | 100.0 |

In a typical operation both of these gaseous mixtures are contacted at a pressure of about 20 pounds per square inch with 292 pounds of activated charcoal per thousand standard cubic feet of feed gas. In the case of the nitrogen-free gas 71% of the carbon dioxide in the feed gas is produced with the acetylene as a rich gas product; whereas, in the gas-containing nitrogen only 52% of the $CO_2$ is so produced as contamination with the acetylene. The acetylene recoveries in both cases are 97% to 99%.

This effect of inhibiting the production of carbon dioxide with the acetylene product is a significant one since when pure acetylene is desired a separation must be subsequently made.

In the acetylene-production step of the process according to this invention it is preferred that natural gas be employed as the hydrocarbon portion of the reactant gas mixture although as shown in the illustration pure methane or mixtures with ethane and propane or those gases by themselves may be employed. It is not intended to exclude the normally liquid hydrocarbons for these may be vaporized and the vapor treated according to the present invention.

The oxygen-containing gas may be pure oxygen, although air is preferred. Oxygen-enriched air may also be employed.

The proportion of oxygen employed is between about 20% and about 50% in excess over the theoretical quantity required to convert the hydrocarbon employed to acetylene. When methane is employed the ratio of hydrocarbon to oxygen is preferably greater than 1.33 such as for example between about 1.33 and 2.0. Preferably with methane the ratio is between about 1.5 and 1.8. In the conversion of natural gas with air a suitable range of mixtures includes those containing between 17% and 30% by volume of natural gas.

The recycle rate of hydrogen with respect to the quantity of hydrocarbon employed in the reactant gas may vary between 0.5 and about 5.0 mols of hydrogen per mol of hydrocarbon with about 1.5 to 3.0 mols per mol being preferred.

The reaction temperature is usually between about 1100° C. and 1500° C. and preferably between about 1275° C. to 1375° C. The temperature to which the reactant gases are heated directly controls the reaction temperature and usually lies between 950° C. and 1150° C. It is preferred that the preheating be effected in between about 0.005 and about 0.5 second in order to inhibit premature and undesired reactions. The actual reaction time after hydrogen-containing gas addition may be varied from 0.001 to 0.05 second, the preferred reaction time range being 0.002 and 0.02 second.

The gases removed from the reaction zone are immediately quenched preferably to a temperature less than about 650° C. because above this temperature loss of acetylene is apt to occur. Quenching below this temperature is not necessarily required but since the gas must be ultimately cooled to substantially atmospheric temperature for introduction into the adsorption separation step quenching to an atmospheric temperature is desirable. Part of the heat employed may be recirculated to the reactant gases by bringing these two streams into heat exchange relation. Additional quantities of this heat may be dissipated in a waste heat boiler supplying the steam required in the process, for example, as in stripping of the rectified adsorbents in the adsorptive separations.

The reaction pressure is preferably near atmospheric, although pressures in the range of from 5 to about 50 pounds per square inch absolute may be employed.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for producing acetylene which comprises preheating a reactant gas mixture of a hydrocarbon and an oxygen-containing gas, injecting a hydrogen-containing gas into the preheated reactant gas mixture thereby initiating a non-catalytic partial oxidation acetylene-producing reaction in a reaction zone to form a conversion effluent containing acetylene and unreacted hydrocarbon, contacting the effluent with a first moving bed of solid granular adsorbent at a relatively low pressure to separate an acetylene fraction and carbon dioxide and said unreacted hydrocarbon from less readily adsorbable conversion products and hydrogen as an unadsorbed gas, subsequently contacting said unadsorbed gas with a second moving bed of solid granular adsorbent at a relatively high pressure to adsorb more readily adsorbable constituents thereof including carbon monoxide in the absence of carbon dioxide leaving a gas enriched in hydrogen substantially unadsorbed, separately desorbing said unreacted hydrocarbon and said acetylene fraction from said first moving bed of adsorbent, recirculating said unreacted hydrocarbon for reaction with further quantities of said oxygen-containing gas, recirculating at least part of said gas enriched in hydrogen to initiate the reaction by injection of said hydrogen into the preheated mixture of said hydrocarbon and oxygen-containing gas in said reaction zone, and purifying said acetylene fraction produced.

2. A method for producing acetylene which comprises preheating a mixture of an oxygen-containing gas and a hydrocarbon in the vapor phase, injecting a hydrogen-containing gas into said mixture thereby initiating a non-catalytic partial oxidation acetylene-producing reaction forming an acetylene-containing effluent gas, cooling said effluent, contacting the cooled effluent gas in a first adsorption stage at relatively low pressure with a moving bed of solid granular adsorbent to adsorb acetylene and carbon dioxide and more readily adsorbable constituents leaving less readily adsorbable constituents and hydrogen substantially unadsorbed, subsequently contacting the unadsorbed gas in a second adsorption stage at a relatively high pressure with a moving bed of solid granular adsorbent in the absence of carbon dioxide to adsorb the more readily adsorbable constituents thereof including carbon monoxide leaving a gas enriched in hydrogen unadsorbed, recirculating at least part of said gas enriched in hydrogen to initiate said acetylene-producing reaction by injecting said hydrogen into said preheated mixture of hydrocarbon and oxygen-containing gas, and desorbing an acetylene product from the rich adsorbent formed in said first adsorption stage.

3. A process for the production of acetylene which comprises the steps of preheating a reactant gas mixture containing a normally gaseous hydrocarbon and an oxygen-containing gas to an elevated temperature insufficient to cause substantial reaction, injecting a gaseous stream of hydrogen gas into the preheated reactant gas mixture to initiate a non-catalytic partial oxidation acetylene-producing reaction, quenching the effluent gases from 0.001 to 0.05 second after the initiation of said reaction, contacting the cooled effluent gases with a moving bed of solid granular adsorbent in a first adsorption stage at a relatively low pressure thereby adsorbing acetylene and more readily adsorbable constituents therefrom leaving less readily adsorbable constituents and hydrogen substantially unadsorbed, subsequently contacting the unadsorbed gas with a moving bed of solid granular adsorbent in a second adsorption stage at a relatively high pressure to adsorb the more readily adsorbable constituents thereof including carbon monoxide leaving hydrogen in substantially pure form as an unadsorbed gas, desorbing adsorbed constituents from the rich adsorbent formed in said first adsorption stage, separating acetylene in substantially pure form therefrom, recycling at least a portion of said substantially pure hydrogen separated from said second adsorption stage, and injecting said hydrogen into said preheated reactant gas mixture to initiate said acetylene-producing reaction.

4. A process for the production of acetylene which comprises preheating a reactant gas containing normally gaseous hydrocarbon and an oxygen-containing gas to a temperature insufficient to cause substantial reaction, injecting a gaseous stream of hydrogen into the preheated reactant gas to initiate a non-catalytic partial oxidation acetylene-producing reaction, sustaining said reaction for about 0.001 to 0.05 second, subsequently quenching the effluent gases to stop the acetylene-producing reaction, contacting the gaseous effluent mixture in a first adsorption zone with a first moving bed of granular adsorbent at a relatively low pressure between about 5 and about 50 p. s. i. a. to form a first rich adsorbent containing adsorbed acetylene and leaving a substantially unadsorbed gas containing hydrogen, nitrogen and carbon monoxide, desorbing adsorbed acetylene from said first rich adsorbent, contacting unadsorbed gas removed from said first adsorption zone with a second moving bed of granular adsorbent at a relative high pressure between about 350 and about 600 p. s. i. g. in a second adsorption zone, removing an unadsorbed gas containing substantially pure hydrogen from said second adsorption bone, and recirculating at least part of said substantially pure hydrogen to initiate said acetylene-producing reaction.

5. A process for the production of acetylene by the non-catalytic partial oxidation of hydrocarbon which comprises preheating a reactant gas mixture of a normally gaseous hydrocarbon and an oxygen-containing gas to an elevated temperature insufficient to cause substantial reaction therebetween, passing said mixture into a reaction zone, injecting thereinto a hydrogen-containing gas thereby initiating a non-catalytic partial oxidation acetylene-producing reaction forming an effluent gas containing acetylene and hydrogen, quench cooling the hot effluent gas thus produced within from 0.001 to 0.05 second after initiating said reaction, contacting the cooled effluent gas with a moving bed of solid granular adsorbent in a first adsorption stage at a pressure between about 5 and about 50 p. s. i. a. to adsorb acetylene and more readily adsorbable constituents thereof including carbon dioxide leaving less readily adsorbable constituents and hydrogen substantially unadsorbed, subsequently desorbing acetylene from said first moving bed of adsorbent, compressing the unadsorbed gas from said first moving bed of adsorbent to a pressure between about 350 and 600 pounds per square inch gauge, contacting the thus compressed gas with a moving bed of solid granular adsorbent in a second adsorption stage in the absence of carbon dioxide to adsorb the more readily adsorbable constituents thereof including carbon monoxide leaving hydrogen in substantially pure form unadsorbed, recirculating at least part of the hydrogen thus produced, and injecting said hydrogen into said preheated reactant gas mixture to initiate said acetylene-producing reaction in said reaction zone.

6. A process according to claim 5 wherein said mixture of normally gaseous hydrocarbon and oxygen-containing gas is preheated to a temperature sufficient to result in a reaction temperature within the range of from 1100° C. to 1500° C. upon injection of said hydrogen-containing gas.

7. A process according to claim 5 wherein unreacted hydrocarbon is desorbed from said first moving bed or adsorbent in the presence of carbon dioxide, is contacted with a third moving bed of solid granular adsorbent in an auxiliary adsorption zone to separate unreacted hydrocarbon therefrom, and said unreacted hydrocarbon is recirculated to said acetylene producing reaction for retreatment with further quantities of said oxygen-containing gas.

8. A process according to claim 5 wherein said first and second moving bed of solid granular adsorbent comprises activated charcoal.

9. A process according to claim 5 wherein said effluent gas is contacted with between about 150 and 350 pounds of activated charcoal per thousand standard cubic feet of said effluent gas, and the unadsorbed hydrogen-containing gases from said first moving bed are subsequently contacted with between about 500 and 1100 pounds of activated charcoal per thousand standard cubic feet of said hydrogen-containing gases.

10. A process for the production of acetylene by the non-catalytic partial oxidation of hydrocarbon which comprises preheating a reactant gas mixture of methane and an oxygen-containing gas to an elevated temperature insufficient to cause substantial reaction therebetween, passing said mixture into a reaction zone, injecting thereinto a hydrogen-containing gas thereby initiating a non-catalytic partial oxidation acetylene-producing reaction forming an effluent gas containing unreacted methane, acetylene, carbon dioxide, carbon monoxide, nitrogen and hydrogen, quench cooling the hot effluent gas thus produced within from 0.001 to 0.05 second after initiating said reaction, recirculating a granular adsorbent in a first adsorption stage successively through an adsorption zone, a primary rectification zone, a secondary rectification zone, and a desorption zone, passing said effluent gas through said primary adsorption zone at a pressure between about 5 and about 50 p. s. i. a. forming a rich adsorbent containing adsorbed methane, carbon dioxide, and acetylene and leaving hydrogen, nitrogen and carbon monoxide substantially unadsorbed, contacting said rich adsorbent in said first rectification zone with a gaseous reflux containing unreacted methane and carbon dioxide to desorb traces of less readily adsorbable constituents forming a partially rectified adsorbent, subsequently contacting said partially rectified adsorbent in said second rectification zone with a gaseous reflux of acetylene thereby desorbing methane and carbon dioxide forming a rectified adsorbent, contacting the thus desorbed carbon dioxide and methane with a moving bed of granular adsorbent passing through an auxiliary purification zone to adsorb carbon dioxide leaving methane substantially unadsorbed, recirculating the methane for retreatment in said acetylene-producing reaction, subsequently desorbing acetylene from said rectified adsorbent in said first adsorption stage as a product gas leaving a lean adsorbent, employing part of the thus desorbed acetylene as reflux in said second rectification zone, employing another part to desorb carbon dioxide from the moving bed of granular adsorbent in said auxiliary purification zone, compressing the unadsorbed gas from said first moving bed of adsorbent to a pressure between about 350 and 600 pounds per square inch gauge, contacting the thus compressed gas with a moving bed of solid granular adsorbent in a second adsorption stage in the absence of carbon dioxide to adsorb the more readily adsorbable constituents thereof leaving hydrogen in substantially pure form unadsorbed, recirculating at least part of the hydrogen thus produced, and injecting said hydrogen into said preheated reactant gas mixture to initiate said acetylene-producing reaction in said reaction zone.

11. A process for the production of acetylene which comprises forming a reactant gas containing methane and air in such proportion that the hydrocarbon-to-oxygen mol ratio is between about 1.33 and 2.0, preheating said reactant gas to between about 950° C. and 1150° C., initiating an acetylene producing reaction by injecting between about 0.5 and about 5.0 mols of hydrogen per mol of hydrocarbon, sustaining the acetylene-producing reaction for between about 0.001 and 0.05 second at a temperature between about 1100° C. and 1500° C., quench cooling the reaction product to a temperature less than 650° C., contacting the cooled effluent gas in a first adsorptive separation zone with between about 150 and 350 pounds of activated charcoal as a moving bed per thousand standard cubic feet of effluent gas thereby adsorbing unreacted methane, carbon dioxide, acetylene and more readily adsorbable constitutuents forming a rich charcoal leaving hydrogen, nitrogen and carbon monoxide substantially unadsorbed at a pressure of between about 5 and 50 pounds per square inch absolute, desorbing unreacted methane from said rich charcoal by means of an acteylene-containing reflux gas forming a rectified charcoal, recirculating said methane for retreatment in said acetylene-producing reaction, desorbing acetylene and more readily adsorbable constituents from said rectified charcoal, separating acetylene from the thus desorbed gas, compressing the unadsorbed gas from said first adsorptive separation zone to a pressure of between about 350 and 600 pounds per square inch gauge, contacting the compressed gas in a second adsorptive separation zone with between about 500 and 1100 pounds of activated charcoal as a moving bed per thousand standard cubic feet of compressed gas thereby adsorbing nitrogen and carbon monoxide in the absence of carbon dioxide and leaving hydrogen in substantially pure form unadsorbed, and recirculating at least part of the thus produced hydrogen therefrom for injection into said reaction zone to initiate said acetylene-producing reaction.

12. A process according to claim 11 wherein the activated charcoal circulated through said first adsorptive separation zone is divided into a first and second separate stream therein in combination with the steps of contacting said effluent gas with said first stream of adsorbent to adsorb methane, acetylene, and carbon dioxide, contacting the subsequently combined first and second streams of charcoal with an acetylene gas reflux to desorb a mixture of methane, carbon dioxide and acetylene, contacting the thus desorbed gas with said second stream of charcoal leaving methane and carbon dioxide substantially unadsorbed, and separating the thus unadsorbed gas from said second stream substantially free of acetylene as a side cut gas.

13. A process according to claim 12 in combination with the steps of passing a third stream of activated charcoal successively through an auxiliary adsorption zone, an auxiliary rectification zone, and an auxiliary desorption zone, passing said side cut gas through said auxiliary adsorption zone to adsorbed carbon dioxide leaving methane substantially unadsorbed, then contacting the charcoal in said auxiliary rectification zone with a carbon dioxide reflux to desorb traces of adsorbed methane, then desorbing adsorbed carbon dioxide from the charcoal in said auxiliary desorption zone, and combining said first, second, and third streams of activated charcoal.

14. A process according to claim 13 wherein said carbon dioxide is preferentially desorbed from said rectified charcoal by means of an acetylene-containing gas reflux and said third stream of charcoal is subsequently treated for acetylene desorption.

15. An apparatus for the production of acetylene which comprises an acetylene reactor provided with at least one elongated preheating conduit discharging into a reaction chamber in turn opening into a quenching chamber, means for introducing a gaseous mixture containing a hydrocarbon and oxygen through said preheating conduit into said reaction chamber, conduit means for a hydrogen-containing gas opening into said reaction chamber, conduit means for a quenching fluid opening into said quenching chamber, a first and a second selective adsorption column each provided at successively lower levels therein with an adsorption section, at least one rectification section and a desorption section, means for recirculating granular adsorbent removed from the bottom of each of said columns to the top of each thereof, means for controlling a gravity flow of compact granular adsorbent through each of said columns, conduit means for quenched acetylene-bearing gases communicating said quenching chamber with the adsorption section in said first adsorption column, conduit means for unadsorbed gases communicating said first adsorption section with the adsorption section in said second adsorption column, turbine driven gas compressing means in series with the last named conduit, conduit means for an unadsorbed hydrogen-rich gas communicating the last-named adsorption section with said reaction chamber in said reactor through the turbine drive of said gas compressing means, conduit means for unreacted hydrocarbon communicating a rectification section in said first adsorption column with said preheating conduit in said reactor, conduit means for desorbed gases containing acetylene opening from the desorption section in said first adsorption column, and conduit means for desorbed gases opening from the desorption section in said second adsorption column.

16. An apparatus according to claim 15 wherein said first selective adsorption column is provided with an adsorbent hopper and a cooling section above said adsorption section, a separate auxiliary purification column disposed adjacent said first adsorption column, conduit means for a portion of granular adsorbent communicating said adsorbent hopper with the top of said auxiliary column, conduit means for a desorbed gas communicating one of said rectification sections of said first adsorption column with said auxiliary column at a point intermediate its upper and lower ends, conduit means for unadsorbed gases opening from adjacent the top thereof, conduit means for a portion of desorbed gases communicating said desorption section of said first adsorption column with the bottom of said auxiliary column, and conduit means for adsorbent communicating the bottom of said auxiliary column with the desorption section of said first selective adsorption column.

17. A process according to claim 11 wherein the moving bed of activated charcoal in said second adsorptive separation zone following contact with said compressed gas is first contacted with a rich gas reflux containing carbon monoxide to desorb said nitrogen as a side cut gas product therefrom, subsequently desorbing the adsorbed carbon monoxide, employing part of said carbon monoxide as said reflux gas, and removing the remainder as a carbon monoxide-rich product gas from said second adsorptive separation zone.

References Cited in the file of this patent

UNITED STATES PATENTS

| Number | Name | Date |
|---|---|---|
| 2,167,471 | Auerbach | July 25, 1939 |
| 2,495,842 | Gilliland | Jan. 31, 1950 |
| 2,498,444 | Orr | Feb. 21, 1950 |
| 2,519,342 | Berg | Aug. 22, 1950 |
| 2,519,873 | Berg | Aug. 22, 1950 |
| 2,523,149 | Scheeline | Sept. 19, 1950 |
| 2,529,289 | Gilliland | Nov. 7, 1950 |
| 2,549,240 | Robinson | Apr. 17, 1951 |

FOREIGN PATENTS

| Number | Country | Date |
|---|---|---|
| 332,731 | Great Britain | July 31, 1930 |
| 349,067 | Great Britain | May 14, 1931 |